United States Patent [19]

Winterhager et al.

[11] 4,017,307
[45] Apr. 12, 1977

[54] THERMAL METHOD FOR THE RECOVERY OF METALS AND/OR METAL COMBINATIONS WITH THE AID OF A MELTING CYCLONE

[75] Inventors: Helmut Winterhager, Aachen; Roland Kammel, Berlin; Horst Weigel, Cologne-Bruck, all of Germany

[73] Assignee: Klockner-Humboldt-Deutz Aktiengesellschaft, Germany

[22] Filed: Apr. 20, 1976

[21] Appl. No.: 678,496

Related U.S. Application Data

[63] Continuation-in-part of Ser. No. 507,785, Sept. 20, 1974, abandoned.

[30] Foreign Application Priority Data

Sept. 25, 1973 Germany .......................... 2348105

[52] U.S. Cl. ...................................... 75/72; 75/23; 75/26; 75/63; 75/86; 266/162; 266/204
[51] Int. Cl.² .......................................... C22B 15/00
[58] Field of Search .............. 75/26, 40, 23, 91, 92, 75/74, 86; 266/204, 162

[56] References Cited

UNITED STATES PATENTS

| | | | |
|---|---|---|---|
| 2,395,286 | 2/1946 | Merle ................................ | 75/93 R |
| 2,865,734 | 12/1958 | Klemantaski .......................... | 75/40 |
| 3,607,224 | 9/1971 | Blaskowski ........................... | 75/26 |
| 3,756,806 | 9/1973 | Hathorn ............................ | 75/93 R |
| 3,759,501 | 9/1973 | Foard ............................ | 266/204 X |

Primary Examiner—M. J. Andrews
Attorney, Agent, or Firm—Hill, Gross, Simpson, Van Santen, Steadman, Chiara & Simpson

[57] ABSTRACT

Starting materials continuously charged into a cyclone reactor are continuously discharged in molten state into a flow-through buffer hearth chamber from which the gases are withdrawn, the molten materials flowing continuously as received at one end of a relatively short flow area along the bottom of the chamber toward the opposite end of the chamber from which the molten materials are continuously discharged downwardly into the top of an upright axis centrifugal separator in which the materials are centrifugally separated into a metallic phase and a slag phase and respectively discharged through exits at the lower end of the separator and offset from the axis of the separator and radially spaced from each other.

11 Claims, 1 Drawing Figure

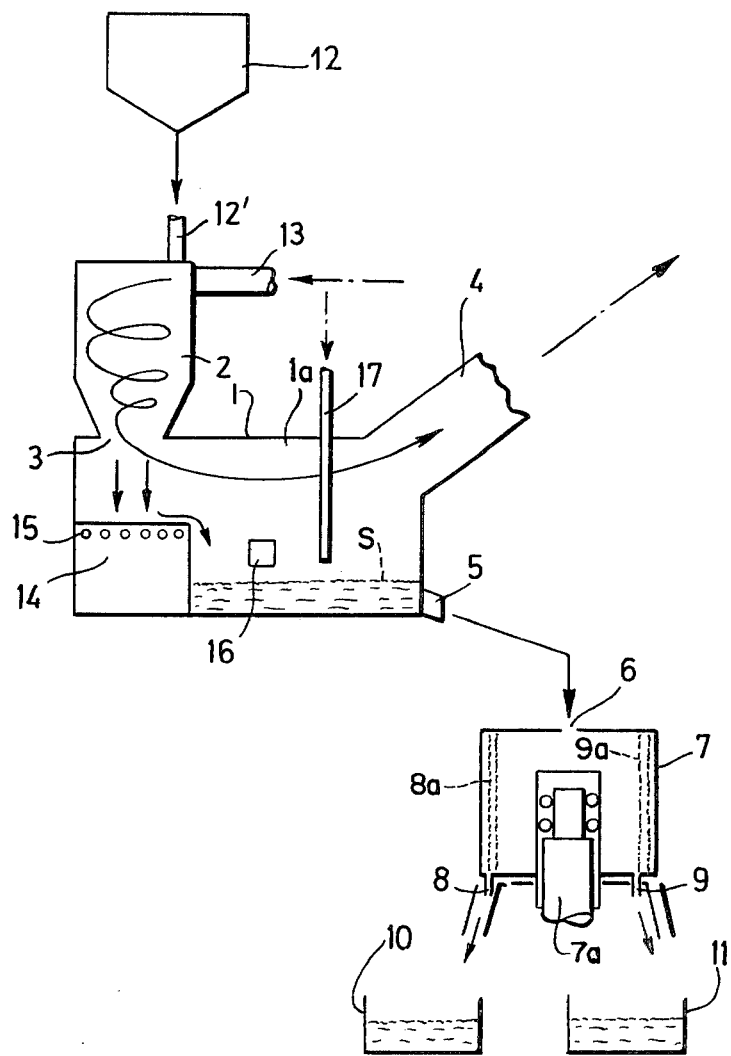

THERMAL METHOD FOR THE RECOVERY OF METALS AND/OR METAL COMBINATIONS WITH THE AID OF A MELTING CYCLONE

This application is a continuation-in-part of our co-pending application Ser. No. 507,785, filed Sept. 20, 1974, now abandoned.

The present invention relates to apparatus for and method of continuous thermal recovery of metals and/or metal combinations from ores, concentrates, or metal-containing intermediary products as starting materials.

From the German Laid Open Specification No. 1,558,749, a method is known for the treatment of ores and concentrates containing non-ferrous and rare metals, in which fine grained charging material is melted in a cyclone melting furnace reactor and the molten materials are supplied to an electrothermal furnace for the separation of slag and stone. A disadvantage of this known method is, for example, that in the processing of copper concentrates, the copper rock occurring in the melt, because of the high speed of movement, is dispersed within the cyclone reactor so finely in the slag phase that upon the subsequent treatment of the melt product recovered in an electromelting furnace, efficient separation of slag and cuprous rock cannot be attained. The amount of cuprous rock that cannot be separated from the slag according to that prior arrangement is so high that in spite of the many advantages of a cyclone reactor for pyrometallurgical processes, the entire method is uneconomical. In addition to the great losses of cuprous rock in the slag, another substantial element of cost is the high utilization of electrical energy for the electro-furnace connected in series and used to separate the rock from the slag.

To similar effect is U.S. Pat. No. 2,865,734 according to which, similarly, as in the above German disclosure reliance is placed entirely upon gravity separation of the metal values from the slag.

U.S. Pat. No. 3,756,806 discloses centrifugal separating of molten metal from impurities in a separator disposed on a diagonal axis with the impurities and gases removed on the axis of the centrifuge and the molten material crowding toward the axis so that it is difficult if not impossible to attain an efficient recovery of the heavier phase material from the lighter phase. There is too great a likelihood of heavier phase material being centrifuged off with the lighter phase material, resulting in costly waste.

Accordingly, it becomes appropriate to devise means by which the disadvantages of the previously known apparatus and methods may be overcome.

SUMMARY OF THE INVENTION

According to the present invention the disadvantages, deficiencies, inefficiencies, shortcomings and problems in the prior apparatus and methods are overcome by continuously charging starting materials comprising ores, concentrates, or metal-containing intermediary products into a cyclone reactor and therein continuously melting the starting materials, continuously discharging molten materials and gases from the reactor into one end of a generally horizontal flow-through buffer hearth chamber within an enclosure, continuously withdrawing gases from the upper portion of the opposite end of the chamber, continuously receiving the molten materials discharged from the reactor at said one end of the chamber and flowing the molten materials continuously toward said opposite end of the chamber along a relatively short molten materials flow area along the bottom of said chamber, continuously discharging the molten materials at a substantially uniform flow rate from said flow area through a discharge opening leading downwardly from the flow area at said opposite end of the chamber, maintaining the molten materials along the length of said relatively short bottom flow area in the chamber at a temperature substantially as received from the reactor and in a thoroughly fluid state and continuously flowing toward said opposite end of the chamber without additional heating, buffering the flow volume of said molten materials along said relatively short flow area and assuring a continuous supply of molten materials to said discharge opening even though the discharge output from the reactor may fluctuate, continuously receiving molten materials downwardly through an upper end entrance into an upright axis centrifugal separator, continuously centrifugally separating the molten materials in said separator and about the axis of the separator into a metallic phase and a slag phase, and continuously discharging the metallic phase of the molten materials and the slag phase of the molten materials from the lower end of the separator through respective exits offset from the axis of the separator and radially spaced from each other.

An important advantage of the method in accordance with this invention lies in the fact that, in spite of fine dispersion of the metallic phase in the slag phase, a practically complete separation of the metallic phase and slag phase is possible, since as compared with prior methods, a substantially higher force than the force of gravity can be efficiently applied with simple apparatus.

A further advantage lies in the fact that on account of the high continuous yield of material which may be attained with such a cyclone reactor even with small units, continuous separation of the metallic phase from the slag phase becomes possible. In contrast to the known methods, the separation is carried out continuously in a centrifugal separator apparatus, likewise of small structure. In view of this the driving energy is required only for operation of the centrifugal force separator, thus providing according to the invention a small structured, continuously separating thermal apparatus.

The phrase "metallic phase" as used herein comprises according to the type of the starting material being treated with the aid of the method according to the invention, both a metal rock, that is, with a mixture of metal sulfides occurring in the cyclone reactor in the melting processes, as well as a feed, that is, a mixture of metal-arsenides or metal-antimonides occurring during the melting processes, and also a pure metal with corresponding starting materials.

According to other features of the invention, the centrifugal separation is effected by means of a separator rotating at a high rate of speed and which has spaced from its axis of rotation respective discharge exit openings radially spaced from one another for the metallic phase and the slag phase, and from which the individual phases are carried off separately from one another. In this connection, it is particularly advantageous to have the molten materials introduced continuously into the top of a vertical continuous flow centrifuge and the separated phases discharged continuously from the lower end of the centrifuge.

Other features and advantages will become more apparent when considering the following description and the drawings.

DESCRIPTION OF THE DRAWINGS

FIG. 1 is a diagrammatic view of apparatus embodying features of the invention for thermal recovery of metals and/or metal combinations from ores, concentrates, or metal-containing intermediary products as starting materials.

DESCRIPTION OF PREFERRED EMBODIMENT

According to the method and apparatus of the present invention, having reference to the diagrammatic flow illustration of FIG. 1, an enclosure 1 defining a generally horizontal flowthrough buffer hearth chamber 1a has a cyclone reactor 2 located to continuously discharge molten materials and gases through a discharge opening 3 into the upper portion of said one end of the chamber 1a. Means in the upper portion of the opposite end of the chamber 1a comprising a gas discharge conduit 4 leading from the enclosure 1 continuously withdraw gases from the chamber 1a. The bottom of the chamber 1a provides a relatively short molten material flow area for receiving the molten materials discharged from the reactor 2 at the one end of the chamber to flow continuously toward the opposite end of the chamber. At such opposite end of the chamber a continuous discharge opening 5 leads downwardly from the bottom flow area and is dimensioned to maintain a substantially uniform discharge flow rate of the molten materials from the discharge opening. The relatively short bottom flow area within the chamber 1a cooperates with the reactor 2 and the discharge opening 5 as a flow volume buffer zone to assure substantially continuous supply S of molten materials to the discharge opening 5 even though the discharge output from the reactor 2 may fluctuate. The length of the bottom flow area from the reactor discharge 3 to the discharge opening 5 is short enough to maintain the molten materials at a temperature in the chamber 1a substantially as received from the reactor 2 and in a thoroughly fluid state and continuously flowing from the reactor discharge 3 to the discharge opening 5 without additional heating.

Direct communication of the outlet 5 is effected through an upper end, preferably centrally located, charging or entrance opening 6 in an upright axis centrifugal separator 7 below the discharge opening 5. Thereby the separator 7 continuously receives molten materials downwardly from the discharge opening 5 and continuously centrifugally separates the molten materials about its axis into a substantially cylindrical metallic phase and a concentric substantially cylindrical slag phase. To this end, the centrifugal separator 7 is mounted for high speed rotation, for example on the order of 10 to 15 m/sec., on and about the axis of a vertical shaft 7a. At the lower end of the separator 7, respective discharge openings or exits 8 and 9 offset from the axis of the separator and radially spaced from each other continuously discharge the molten materials represented by the vertical line 8a and the slag phase of the molten materials, represented by the vertical line 9a, from the separator. The metallic phase of the molten materials discharge continuously from the exit 8 into any suitable collecting device 10 as schematically represented, and the slag phase of the molten materials discharge from the exit 9 into a separate preferred form of collecting device 11 as schematically illustrated.

Means for continuously charging starting materials into the reactor 2 comprise a suitable charging device 12 containing materials to be processed and communicating with the cyclone reactor 2 via a conduit 12'. By means of the charging device 12, a finely grained ores, concentrates, or metal-containing intermediary products which may contain sulfur, and of a preferred grain size of below 1 millimeter, a maximum of 2% moisture, and fully capable of flowing freely are adapted to be introduced into the cyclone reactor 2. The cyclone reactor 2 is supplied through a tangentially arranged charging feed conduit 13 with hot air which is rich in oxygen and may utilize technical pure oxygen (92–95% $O_2$) and entering into the cyclone reactor at high velocity, attaining temperatures to 1800° C. At this heat and due to the relatively short extent of the bottom flow area in the chamber 1a continuous free flow in the flow area will persist continuously from the reactor discharge to the outlet 5. Through additional feed openings, (not shown) or also by means of admixture to the charging material, depending on the type and composition of the starting material to be delivered still additional materials may be introduced enhancing the slag formation and/or the metallurgical reactions. Because of the high speeds of heat transfer, the charging materials melt in the shortest time and flow as a thin molten film on the cyclone wall on a somewhat helically shaped path downward and enter into the chamber 1a onto a fire-bridge 14 arranged directly under the discharge opening 3 of the cyclone. The fire-bridge is for protection against thermal and mechanical stresses and may be cooled with water by means of pipe conduits 15.

The exhaust gases occurring in the melting processes are drawn off through the conduit 4 from the collection hearth 1. Then, according to the type and composition of the starting material, the exhaust gases may be guided through devices in which volatile components of the starting material given off during the melting process may be precipitated.

The molten material S flowing continuously along the bottom area of the chamber 1a consist of a specifically lighter slag and a specifically heavier phase, for example, a metallic rock. Because of the high speed of rotation of the melt within the cyclone reactor, however, the metal rock phase is "emulsified" to an appreciable extent as to quantity in the form of the finest droplets with the specifically lighter slag, so that in the case of the usual precipitation method, under the influence of gravity in an electric furnace connected in series, only an insufficient separation of the metallic phase from the slag phase would be attained. Under those conditions the discharged amounts of metallic phase together with the slag would be so high that the entire method becomes uneconomical. On account of the size of the electric furnace necessary and the necessarily long periods of precipitation, the gravity separation operation can only be carried out intermittently as a batch operation with the entire installation, even if there is continuous operation of the cyclone reactor, since tapping from the electric furnace may be carried out only at predetermined time intervals, depending on a sufficient separation of the metallic rock from the slag. As opposed to this, the molten materials running into the chamber 1a, according to the method of the present invention, flow directly and continuously into the centrifuge connected in series. In the centrifuge 7 which is driven at peripheral speeds of, for example, 12 m/sec., the molten materials introduced therein are centrifuged or thrown onto the wall of the rotating centrifugal drum and separated under the influence of the high centrifugal force-field corresponding with the differing densities into a heavy metallic phase and a lighter slag phase. As the centrifuge 7 is preferably so constructed that it operates according to the principle of the direct flow centrifuge, the separated phases are continuously removed at the other end. In spite of the fine dispersion of metallic rock phase and slag phase, there results in the charged melt an almost complete separation of the two phases from one another.

Fundamentally, when designing the centrifugal force separator 7 for a special type of application, one must proceed from the basis that the centrifugal separator size and the period of dwell of the melt to be separated must be greater in the case of small differences in density between the metallic phase and slag phase than in the case of greater differences in density between the phases to be separated.

The method generally described can be used with particular advantage in the case of an appropriate starting material for the melting of a copper metal, metallic tin or, in the case of mixed ores with components capable of volatilization and small contents of precious metals. In this case, the volatilization of the components capable of volatilization takes place in the cyclone reactor 2. Upon separation of the slag phase from the metallic phase having greater density, there results by means of the practically complete separation from the slag phase, a metallic phase enriched by precious metals. The precious metals may then be recovered in an economically adaptable manner in subsequent fusion processes.

In certain applications it is advantageous to have the flow-through chamber 1a provided with devices for a metallurgical after-treatment of the melt by means of solid and/or gaseous reaction media. Thus, for example, in the processing of sulfur-containing ores or ore concentrates, it is of advantage if pyrite is added to the melt S disposed in the flow area of the chamber 1a, before the melt is introduced into the centrifugal separator 7. This may be done by a charging device 16, indicated diagrammatically in the drawing, and/or reducing gases introduced into the melt, either by blowing on the surface by means of a nozzle 17, or by means of blowing directly into the melt. Also with this manner of procedure, the efficiency of the continuously operating cyclone reactor 2 is taken advantage of to the fullest extent in connection with the continuous separation of the metallic phase from the slag phase. During subsequent treatment, some small quantities of metal oxides forming in the melting reactor 2 are converted into droplets of metallic rock, which because their small size may be recovered and separated from the slag phase in an economical manner by the method according to the present invention.

From the foregoing it will apparent that the present invention provides for the rapid, continuous thermal recovery of metal and/or metal combinations from ores, concentrates, or metal-containing intermediary products as starting materials, and the method is adapted to be practiced in quite compact apparatus. For example, yields of on the order of 500 tons per day of copper-zinc concentrate can be attained where the cyclone reactor 2 has inside dimensions of on the order of from about 1.5 to 2 meters diameter and 2 meters in height and into which the combustion gas and starting materials may be introduced to whirl about the inside of the reactor at a velocity of about 80–120 meters per second. Then, because of the short continuous flow-through the chamber 1a and through the centrifugal separator 7, the speed of processing from the time the starting materials are charged into the reactor 2 until discharge from the centrifugal separator 7 occurs continuously in a bare few minutes. This is in sharp contrast to prior gravity settling hearth arrangements which can only be operated at batch intervals and require several hours for settling out of the metallic phase from the slag phase. Another advantage of the rapid processing according to the present invention is that undesired magnetite formation is avoided. Due to the high efficiency of the continuous melt, flowthrough and separation according to the present invention it is possible to thermally recover a substantially greater amount of valuable metal. For example in processing cuprous materials, separation of the metallic phase and the slag phase is, according to the present invention of such efficiency that only a very small copper content of about 0.2 to a maximum of 0.3/5% carry over into the slag is attained even where the starting materials consist of at least 50% copper ore. In contrast in the prior gravity settling process resulted in the economical loss of at least 0.4% Cu in the slag. Because of the short duration of travel of the molten materials from the reactor 2 to the centrifuge separator 7 no heating is needed in the continuously flowing molten material S in the chamber 1a and therefore a significant energy saving is accomplished as compared to the pyrometallurgical process heretofore generally employed in which the materials must stand for a long time in a settling basin and must accordingly be heated to avoid premature congealing of the materials.

What is claimed is:

1. A thermal method of continuously recovering metals and/or metal combination from ores, concentrates, or metal-containing intermediary products as starting materials, comprising:

continuously charging starting materials into a cyclone reactor and therein continuously melting the starting materials;

continuously discharging molten materials and gases from the reactor into one end of a generally horizontal flowthrough buffer hearth chamber within an enclosure;

continuously withdrawing gases from the upper portion of the opposite end of the chamber;

continuously receiving the molten materials discharged from the reactor at said one end of the chamber and flowing the molten materials continuously toward said opposite end of the chamber along a relatively short molten materials flow area along the bottom of said chamber;

continuously discharging the molten materials at a substantially uniform flow rate from said flow area through a discharge opening leading downwardly from said flow area at said opposite end of the chamber;

maintaining the molten materials along the length of said relatively short bottom flow area in the chamber at a temperature substantially as received from the reactor and in a thoroughly fluid state and continuously flowing toward said opposite end of the chamber without additional heating;

buffering the flow volume of said molten materials along said relatively short flow area and assuring a continuous supply of molten materials to said discharge opening even though the discharge output from the reactor may fluctuate;

continuously receiving molten materials downwardly from said discharge opening through an upper end entrance into an upright axis centrifugal separator;

continuously centrifugally separating the molten materials in said separator and about the axis of the separator into a substantially cylindrical metallic phase and a concentric substantially cylindrical slag phase;

and continuously discharging the metallic phase of the molten materials and the slag phase of the molten materials from the lower end of the separator through separate respective exits offset from the axis of the separator and radially spaced from each other.

2. A method according to claim 1, comprising charging copper and zinc containing starting materials into said cyclone reactor, and recovering copper and zinc values in the metallic phase discharged from said separator.

3. A method according to claim 1, wherein the starting materials are sulfur-containing, and adding pyrite to the molten materials in the flow area in said chamber.

4. A method according to claim 1, including introducing reducing gases to the molten material in said flow area in the chamber.

5. A method according to claim 1, including introducing solid reaction media into the molten material in said flow area in said chamber.

6. A method according to claim 1, including introducing gaseous reaction media to the molten material in the flow area in said chamber.

7. A method according to claim 1, comprising effecting said melting in the cyclone reactor at a temperature on the order of 1800° C., and maintaining the rate of continuous flow from the reactor to the separator to maintain complete fluidity of the molten material as delivered into said chamber from the reactor.

8. Apparatus for the continuous thermal recovery of metals and/or metal combinations from ores, concentrates, or metal-containing intermediary products as starting materials, comprising:

a cyclone reactor for continuously receiving and melting starting materials charged into it;

means for continuously charging starting materials into the reactor;

an enclosure defining a generally horizontal flow-through buffer hearth chamber;

said reactor being located to continuously discharge molten materials and gases into one end of said chamber;

means in the upper portion of the opposite end of said chamber for continuously withdrawing gases from the chamber;

the bottom of said chamber providing a relatively short molten material flow area for receiving the molten materials discharged from the reactor at said one end of the chamber to flow continuously toward said opposite end of the chamber;

a continuous discharge opening leading downwardly from said bottom flow area at said opposite end of the chamber and dimensioned to maintain a substantially uniform discharge flow rate of the molten materials from the discharge opening;

said relatively short bottom flow area cooperating with said reactor and said discharge opening as a flow volume buffer zone to assure substantially continuous supply of molten materials to said discharge opening even though discharge output from the reactor may fluctuate;

the length of said bottom flow area from the reactor discharge to said discharge opening being short enough to maintain the molten materials at a temperature in the chamber substantially as received from the reactor and in a thoroughly fluid state and continuously flowing from the reactor discharge to said discharge opening without additional heating;

an upright axis centrifugal separator below said discharge opening and having an upper end entrance for continuously receiving molten materials downwardly from said discharge opening and continuously centrifugally separating the molten materials about the axis of the separator into a substantially cylindrical metallic phase and a concentric substantially cylindrical slag phase;

and separate respective exits continuously discharging from the lower end of the separator and offset from the axis of the separator and radially spaced from each other;

one of said exits continuously discharging the metallic phase of the molten materials from the separator and the other of said exits continuously discharging the slag phase of the molten materials from the separator.

9. Apparatus according to claim 8, including means associated with said chamber for adding additional materials to the molten materials continuously flowing along said short bottom flow area.

10. Apparatus according to claim 8, including means associated with said chamber for adding reducing gases to the molten materials flowing along said relatively short bottom flow area.

11. Apparatus according to claim 9, wherein said reactor is located to discharge downwardly at said one end of the chamber, and a fire bridge located in the lower portion of the chamber under the reactor and receiving the molten material discharged from the reactor.

* * * * *